United States Patent Office 2,716,139
Patented Aug. 23, 1955

2,716,139

COMPOSITIONS OF PARA-BROMOPHENOLS AND METHOD OF STABILIZING THE SAME

Andrew J. Dietzler, Midland, Mich., assignor to The Dow Chemical Company, Midland, Mich., a corporation of Delaware No Drawing. Application July 1, 1954,
Serial No. 440,857

17 Claims. (Cl. 260—623)

This invention concerns a method and certain addition agents for inhibiting the discoloration and decomposition of para-bromophenols upon exposure to air or light, or upon heating at elevated temperatures. It pertains especially to a method and certain addition agents for stabilizing bromophenols having the general formula:

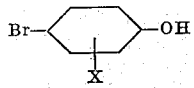

wherein X represents a hydrogen atom, a halogen atom, the phenyl radical, or an alkyl radical, against discoloration and decomposition upon heating the same at elevated temperatures and relates to a procedure for distilling such para-bromophenols in admixture with the stabilizing agents. The invention also concerns compositions comprising the para-bromophenols and the stabilizing agents.

It is well known that phenols, though carefully purified, tend to discolor upon exposure to air or light, or upon heating at elevated temperatures. It has been observed that bromophenols, such as para-bromophenol, 4-bromo-2-phenylphenol, or 4-bromo-ortho-cresol, having the aforementioned general formula, not only tend to discolor upon exposure to air, or light, or upon heating at elevated temperatures, but also tend to decompose or isomerize upon heating to their boiling point or below at atmospheric pressure, or upon heating at subatmospheric pressure for prolonged periods of time. The tendency of such bromophenols to deteriorate, i. e. to discolor or to decompose, upon exposure to the action of air, light, or heat, is usually accelerated by contact with ferrous metals such as iron, carbon steel, or stainless steels. The tendency of para-bromophenols having the aforementioned general formula to decompose upon heating at elevated temperatures is particularly troublesome in the manufacture of said bromophenols on a commercial scale, wherein a crude brominated phenol, e. g. a brominated phenol or a brominated ortho-cresol, reaction mixture is subjected to distillation, usually in an iron, stainless steel, nickel, or glass-lined steel vessel, to recover and separate the para-bromophenol product from the lower and higher boiling components of the crude reaction mixture.

The tendency of the para-bromophenols to decompose upon heating at elevated temperatures renders it difficult to recover or separate the para-bromophenol as a product of high purity from the crude reaction mixture by distillation. Distillation of a discolored, but otherwise pure or substantially pure, para-bromophenol frequently results in the obtainance of a product that is less pure than the starting material. The difficulties appear to occur principally because of the tendency of para-bromophenol to decompose, or to isomerize, upon heating at elevated temperatures, and usually results in the formation of by-products such as phenol, ortho-bromophenol and dibromophenol in admixture with the para-bromophenol. Although para-bromophenol of high purity can be recovered from an impure product, e. g. a crude reaction mixture of phenol and bromine, or a para-bromophenol fraction of lesser purity than is desired, by crystallization from a suitable solvent, such procedure involves the handling and recovery of large amounts of volatile organic liquids, is costly, and the yield of pure, or substantially pure, product is usually undesirably low. The tendency of para-bromophenol to deteriorate upon heating at elevated temperatures is shared to more or less extent by other para-bromophenols having the aforementioned general formula.

It is a primary object of the invention to provide a method and certain addition agents for stabilizing a para-bromophenol having the aforementioned general formula against deteriorating upon exposure to the action of air, light, or heat, at ordinary and elevated temperatures. Another object is to provide a method and stabilizing agents for distilling a para-bromophenol having the aforementioned general formula without decomposition of said phenol. Still another object is to provide compositions comprising a para-bromophenol having the aforementioned general formula and a lead phosphate as the stabilizing agent for inhibiting discoloration or decomposition of the para-bromophenol upon exposure to the action of air, light or heat at ordinary and elevated temperatures. A specific object is to provide a method and agents for stabilizing para-bromophenol against deterioration upon heating at elevated temperatures up to its boiling point at atmospheric pressure. Other and related objects may appear from the following description of the invention.

According to the invention the tendency of a para-bromophenol having the aforementioned general formula to discolor, deteriorate, or isomerize, upon exposure to air or light, or upon heating to elevated temperatures, is substantially reduced, or entirely prevented, by maintaining the para-bromophenol in the presence of, or in admixture with, a stabilizing amount of a lead phosphate; e. g. an amount of a lead phosphate corresponding to from 0.1 to 5 per cent by weight of the para-bromophenol.

As the stabilizing agent there may be employed one or more of the salts, lead orthophosphate $Pb_3(PO_4)_2$, lead hydrophosphate $PbHPO_4$, lead dihydrophosphate $Pb(H_2PO_4)_2$, lead pyrophosphate $Pb_2P_2O_7$, or lead metaphosphate $Pb(PO_3)_2$. Mixtures of any two or more of the lead phosphates may also be used.

The proportion of a lead phosphate to be employed can be varied within wide limits and is dependent in part upon the time and temperature conditions to which the para-bromophenols are to be rendered stable. It usually requires a larger proportion of a lead phosphate to stabilize a given para-bromophenol against deterioration at elevated temperatures of from 120° to 240° C. or above, than is required at lower temperatures of from room temperature up to 100° C. A lead phosphate is usually employed in amount corresponding to from 0.1 to 5, preferably from 0.2 to 2, per cent by weight of the para-bromophenol. The lead phosphates are preferably employed in powdered or finely divided form and in anhydrous or substantially anhydrous condition.

The lead phosphates can be employed as stabilizers or addition agents to suppress, or entirely prevent, the tendency toward discoloration, deterioration, or isomerization, of para-bromophenols having the aforementioned general formula, upon exposure to the action of air, light, or heat, for prolonged periods of time. Examples of para-bromophenols which are rendered stable to the action of air, light, or heating at elevated temperatures, by the addition of one or more of the aforementioned lead phosphates as a stabilizing agent are para-bromophenol, 4-bromo-ortho-cresol, 4-bromo-meta-cresol, 4-bromo-2- tert.-butylphenol, 4-bromo-2-ethylphenol, 4-bromo-2-isopropylphenol, 4-bromo-2-hexylphenol, or 4-bromo-2-phenylphenol.

Stabilization of the para-bromophenol is accomplished by mixing with the para-bromophenol an amount of one or more of the lead phosphates sufficient to prevent or substantially reduce the tendency of the para-bromophenol to undergo discoloration or deterioration, or by maintaining the para-bromophenol in the presence of, or in admixture with, a stabilizing amount of the lead phosphate.

The lead phosphates are insoluble, or substantially insoluble in the para-bromophenols and are conveniently added in powdered or finely divided form.

In practice for stabilizing a bromophenol having the aforementioned general formula, e. g. para-bromophenol or 4-bromo-ortho-cresol, against decomposition upon heating the same at elevated temperatures during distillation, an amount of the lead phosphate addition agent corresponding to from 0.1 to 5 per cent by weight of the bromophenol starting material is added to the bromophenol in the still pot and the distillation carried out in usual ways at atmospheric or subatmospheric pressure such that the bromophenol is heated to boiling at a temperature not exceeding 255° C. and at an absolute pressure of not more than 760 millimeters. Distillation of a bromophenol having the aforementioned general formula is usually carried out at a subatmospheric pressure such that the para-bromophenol is heated to boiling at a temperature not exceeding 255° C., preferably not greater than 200° C., while in admixture with a stabilizing amount of a lead phosphate.

In an alternate procedure for distilling and separating as distillate a para-bromophenol having the aforementioned general formula as a product of high purity, the lead phosphate in finely divided form can be fed to a fractionating column suitably as a dispersion or suspension of the lead phosphate in the liquid para-bromophenol feed material, in which fractionating column the para-bromophenol is rendered stable to decomposition by the presence of the lead phosphate and is distilled, e. g. in continuous manner, and separated from the higher boiling components or residue.

The following examples illustrate ways in which the principle of the invention has been applied, but are not to be construed as limiting its scope.

*Example 1*

A charge of 300 grams of a batch of para-bromophenol having a freezing point of 64.1° C. was placed in a glass distilling flask equipped with an open glass column 6 inches long. Three grams of powdered anhydrous lead orthophosphate was added. The mixture was heated to boiling at atmospheric pressure and the para-bromophenol distilled. The para-bromophenol in the still pot was heated at temperatures between 242° and 243° C. It distilled at a boiling point between 235° and 240° C. at atmospheric pressure, over a period of one hour. There were obtained 280 grams of para-bromophenol as a light tan colored liquid product and 20 grams of residue. The distilled para-bromophenol had a freezing point of 64.1° C.

In contrast, when a charge of 300 grams of the batch of the para-bromophenol was heated to boiling at atmospheric pressure in the glass still in the absence of the lead phosphate, the para-bromophenol started to decompose with evolution of HBr when heated to a temperature of 189° C. It boiled at pot temperatures between 235° and 238° C. and distilled with decomposition at temperatures between 204.5° and 210.5° C. at atmospheric pressure. The distillation was stopped after approximately 15 grams of distillate was obtained. The residue in the still pot was a black color, weighed 240.5 grams and had a freezing point of only 46.8° C.

*Example 2*

A charge of 150 grams of a batch of para-bromophenol (99.1 per cent) having a freezing point of 64° C. was placed in a glass vessel equipped with a reflux condenser and stirrer. The para-bromophenol upon heating to a melting temperature formed a clear colorless liquid. A charge of 1.5 grams of lead orthophosphate, $Pb_3(PO_4)_2$, was added as stabilizing agent. The mixture was stirred and heated at temperatures between 142° and 150° C. over a period of 20 hours. Thereafter, the liquid para-bromophenol was a light amber color. Its freezing point was 64° C.

For purpose of comparison, a charge of 150 grams of the batch of the para-bromophenol was stirred and heated at temperatures between 142° and 150° C. for 20 hours in the absence of the stabilizing agent. Deterioration of the para-bromophenol occurred to an extent such that the liquid was a dark brown color and had a freezing point of only 51.8° C. It was analyzed and found to consist of 2.5 per cent by weight phenol, 6.8 per cent orthobromophenol, 82.9 per cent para-bromophenol and 7.8 per cent 2,4-dibromophenol.

*Example 3*

A charge of 100 grams of a batch of 4-bromo-o-cresol having a freezing point of 62.6° C., together with 1 gram of powdered lead orthophosphate as stabilizing agent, was placed in a glass distilling flask. The mixture was heated to its boiling point under an absolute pressure of 200 millimeters. The 4-bromo-o-cresol distilled at temperatures of from 198° to 200° C. at 200 millimeters absolute pressure while heating the residue in the still pot up to a temperature of 208° C. There were obtained 96.2 grams of 4-bromo-o-cresol as a light yellow colored liquid distillate and 4.6 grams of residue. The loss in distillation was 0.2 gram. The distilled 4-bromo-o-cresol had a freezing point of 62.6° C.

For purpose of comparison 100 grams of the batch of the above-mentioned 4-bromo-ortho-cresol was placed in a glass distilling flask and heated. When heated to a temperature of 195° C. the 4-bromo-o-cresol decomposed with vigorous evolution of hydrogen bromide.

*Example 4*

A charge of 150 grams of a batch of para-bromophenol having a freezing point of 63.8° C. together with 3 grams of lead orthophosphate as stabilizing agent was placed in a glass vessel equipped with a reflux condenser and stirrer. The mixture was stirred and heated at temperatures between 170° and 175° C. over a period of 20 hours. After this treatment, the para-bromophenol was a light brown color and had a freezing point of 62.4° C.

*Example 5*

A charge of 150 grams of the batch of the para-bromophenol described in Example 4, together with 0.15 gram of lead pyrophosphate, $Pb_2P_2O_7$, was placed in a glass vessel equipped with a reflux condenser and stirrer. The mixture was stirred and heated at temperatures between 144° and 151° C. over a period of 20 hours. Thereafter, the para-bromophenol had a light brown color and a freezing point of 63.5° C.

*Example 6*

A charge of 150 grams of a batch of para-bromophenol having a freezing point of 63.8° C., together with 1.5 grams of lead metaphosphate $Pb(PO_3)_2$, was placed in a glass vessel equipped with a reflux condenser and stirrer. The mixture was stirred and heated at temperatures between 145° and 150° C. over a period of 20 hours. After this treatment the liquid para-bromophenol was a light amber color. Its freezing point was unchanged.

In contrast, when a 150 gram portion of the para-bromophenol was heated at temperatures between 145° and 150° C. for 20 hours without the lead metaphosphate, the liquid material was a dark brown color and had a freezing point of only 58.4° C.

*Example 7*

A charge of 150 grams of 4-bromo-2-phenylphenol having a freezing point of 45.2° C. was placed in a glass reaction flask equipped with a reflux condenser and stirrer. One and one-half grams of lead orthophosphate was added as stabilizing agent. The mixture was stirred and heated at temperatures between 145° and 150° C. for a period of 22 hours. After this treatment the color of the liquid material was unchanged. It was a light yellow color.

In contrast when 4-bromo-2-phenylphenol was heated at temperatures between 145° and 150° C. in the absence of the lead phosphate for a period of 22 hours, it was a dark red color.

*Example 8*

A charge of 150 grams of 2,4-dibromophenol having a freezing point of 37.2° C. was placed in a glass reaction flask equipped with a reflux condenser and stirrer, together with 1.5 grams of lead orthophosphate as stabilizing agent. The mixture was stirred and heated at temperatures between 145° and 150° C. for a period of 22 hours. After this treatment the 2,4-dibromophenol was a tan colored liquid and had a freezing point of 37.2° C.

In contrast, when 2,4-dibromophenol was heated at temperatures between 145° and 150° C. for 22 hours in the absence of the lead orthophosphate it had a dark brown color.

*Example 9*

A charge of 150 grams of a batch of crude para-bromophenol having a freezing point of 57.2° C., obtained by reacting bromine with phenol, was placed in a glass reaction flask equipped with a reflux condenser and stirrer, together with 1.5 grams of lead orthophosphate as stabilizing agent. The mixture was heated with stirring at temperatures between 145° and 150° C. for a period of 21 hours. After this treatment the crude para-bromophenol had a freezing point of 57.1° C.

In contrast, when a charge of 150 grams of the batch of the crude para-bromophenol was heated at temperatures between 145° and 150° C. for 21 hours in the absence of the lead orthophosphate, the material was a dark brown color and had a freezing point of only 55.9° C.

I claim:

1. A method of inhibiting the discoloration and decomposition of a bromophenol upon exposure to air and light at ordinary and elevated temperatures, which method comprises maintaining a bromophenol having the general formula:

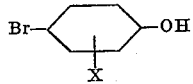

wherein X represents a member of the group consisting of a hydrogen atom, a halogen atom, the phenyl radical and an alkyl radical, in admixture with a stabilizing amount of a lead phosphate.

2. A process as claimed in claim 1, wherein the bromophenol is para-bromophenol.

3. A process as claimed in claim 1, wherein the bromophenol is 4-bromo-ortho-cresol.

4. In a process for distilling a bromophenol, the steps which consist in heating a bromophenol having the general formula:

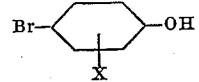

wherein X represents a member of the group consisting of a hydrogen atom, a halogen atom, the phenyl radical and an alkyl radical, to boiling at a temperature not exceeding 255° C. and at an absolute pressure not greater than 760 millimeters, while in admixture with a stabilizing amount of a lead phosphate, whereby the bromophenol is distilled.

5. In a process for distilling 4-bromo-ortho-cresol, the steps which consist in heating the 4-bromo-ortho-cresol to boiling at a temperature not exceeding 255° C. and at an absolute pressure of up to 760 millimeters while in admixture with a stabilizing amount of a lead phosphate, whereby the 4-bromo-ortho-cresol is distilled.

6. In a process for distilling para-bromophenol, the steps which consist in heating the para-bromophenol to boiling at a temperature not exceeding 255° C. and at an absolute pressure of up to 760 millimeters while in admixture with a stabilizing amount of a lead phosphate, whereby the para-bromophenol is distilled.

7. A process as claimed in claim 6, wherein the lead phosphate is lead orthophosphate.

8. A method of inhibiting the discoloration and decomposition of 4-bromo-2-phenylphenol upon exposure to air and light at ordinary and elevated temperatures, which method comprises maintaining the 4-bromo-2-phenylphenol in admixture with from 0.1 to 5 per cent by weight of lead orthophosphate.

9. A method of inhibiting discoloration and decomposition of 4-bromo-ortho-cresol upon exposure to air and light at ordinary and elevated temperatures, which method comprises maintaining the 4-bromo-ortho-cresol in admixture with from 0.1 to 5 per cent by weight of lead orthophosphate.

10. A method of inhibiting discoloration and decomposition of 2,4-dibromophenol upon exposure to air and light at ordinary and elevated temperatures, which method comprises maintaining the 2,4-dibromophenol in admixture with from 0.1 to 5 per cent by weight of lead orthophosphate.

11. A method of inhibiting discoloration and decomposition of para-bromophenol upon exposure to air and light at ordinary and elevated temperatures, which method comprises maintaining the para-bromophenol in admixture with from 0.1 to 5 per cent by weight of lead orthophosphate.

12. A composition comprising a bromophenol having the general formula:

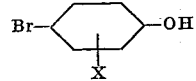

wherein X represents a member of the group consisting of a hydrogen atom, a halogen atom, the phenyl radical and an alkyl radical, and as a stabilizing agent for the bromophenol against discoloration and decomposition upon exposure to air and light at ordinary and elevated temperatures, from 0.1 to 5 per cent by weight of a lead phosphate.

13. A composition as described in claim 12, wherein the bromophenol is 4-bromo-2-phenylphenol.

14. A composition as described in claim 12, wherein the bromophenol is 4-bromo-ortho-cresol.

15. A composition as described in claim 12, wherein the bromophenol is 2,4-dibromophenol.

16. A composition comprising para-bromophenol and as a stabilizing agent for inhibiting discoloration and decomposition of the para-bromophenol upon exposure to air and light at ordinary and elevated temperatures, from 0.1 to 5 per cent by weight of a lead phosphate.

17. A composition comprising para-bromophenol and from 0.1 to 5 per cent by weight of lead orthophosphate.

No references cited.